[11] 3,628,861

[72] Inventor Ge(
Ea(
[21] Appl. No. 85!
[22] Filed Au(
[45] Patented Dec. 21, 1971
[73] Assignee The United States of America as represented by the Secretary of the Army The Bell System Technical Journal, 968, pp. 2095–2109.

.. Corbin
_ovitz, Edward J. Kelly, Herbert Berl and Daniel D. Sharp

[54] MULTIBEAM OPTICAL WAVE TRANSMISSION
7 Claims, 19 Drawing Figs.
[52] U.S. Cl. .................................................. 350/96WG, 350/31, 350/193
[51] Int. Cl. .................................................. G02b 27/00
[50] Field of Search .................................................. 350/96 WG

[56] References Cited
UNITED STATES PATENTS
3,468,598 9/1969 Ito .............................. 350/96 WG UX OTHER REFERENCES
Gloge et al., " The Capacity of Multiple Beam Waveguides ABSTRACT: A system including an optical beam wave guide for simultaneous propagation of a plurality of independent spatially coherent optical beams with minimal mutual interference; the optical beam wave guide includes either (1) a series of spaced lenses or other beam iterating means, one at each of a plurality of distinct positions for beam iteration (reconstitution) along the length of the guide for transmitting simultaneously all of the optical beams, (2) an array of separate optical elements at each iteration position, each element of a given array passing only one of said optical beams, or (3) a combination of the aforesaid arrangements wherein a set of M optical elements is used at each iteration position and each of the M optical elements is designed to transmit a group of N beams so that the total number of transmitted beams is MN.

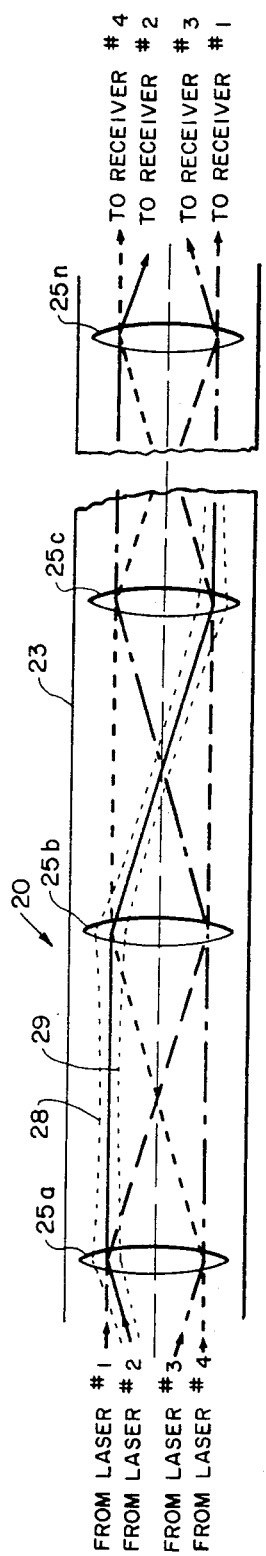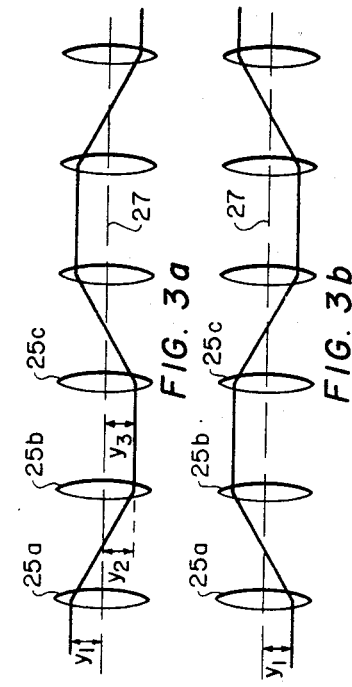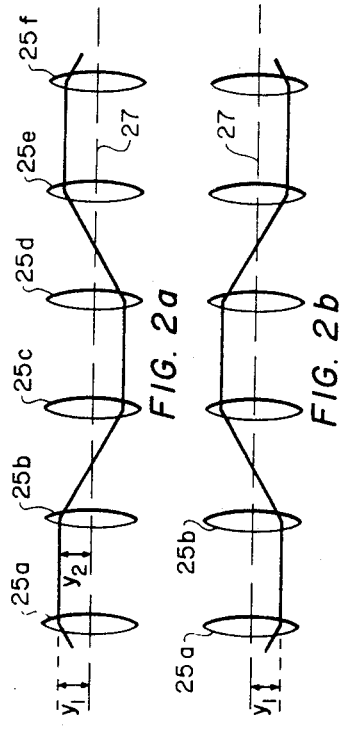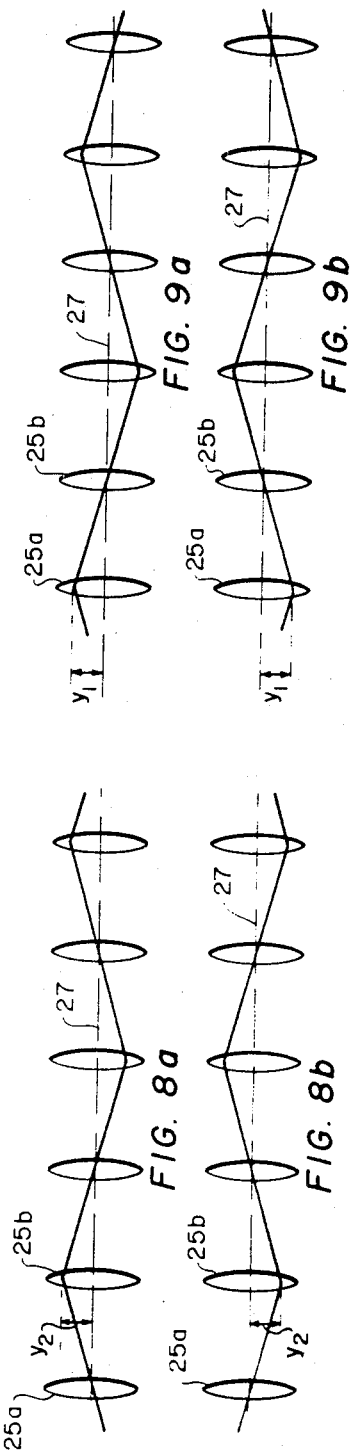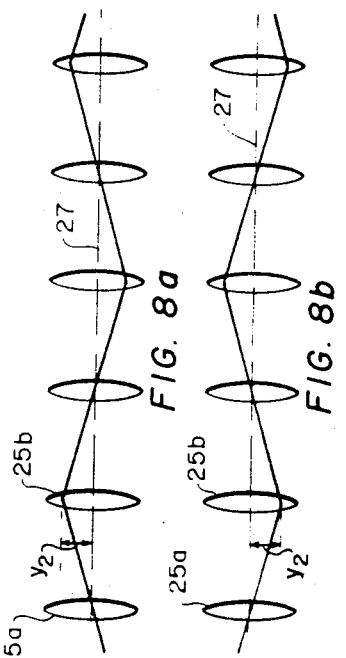

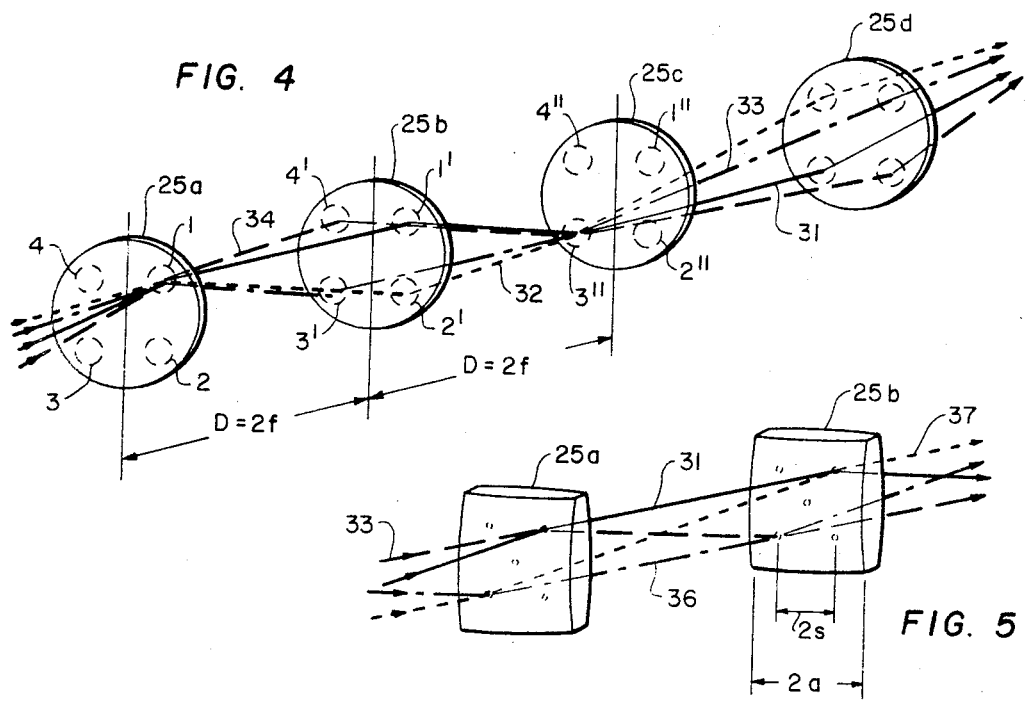
FIG. 4
FIG. 5
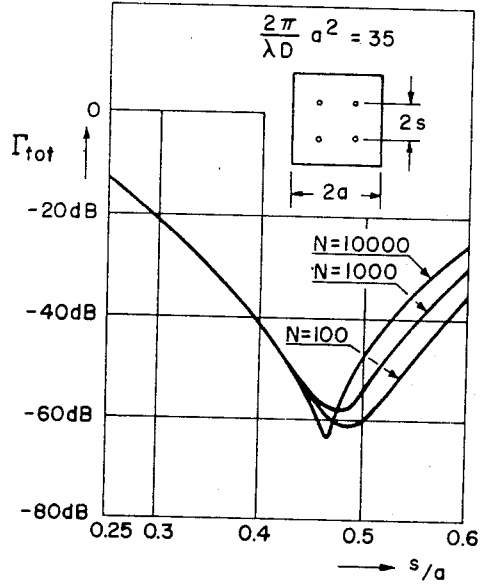
FIG. 7
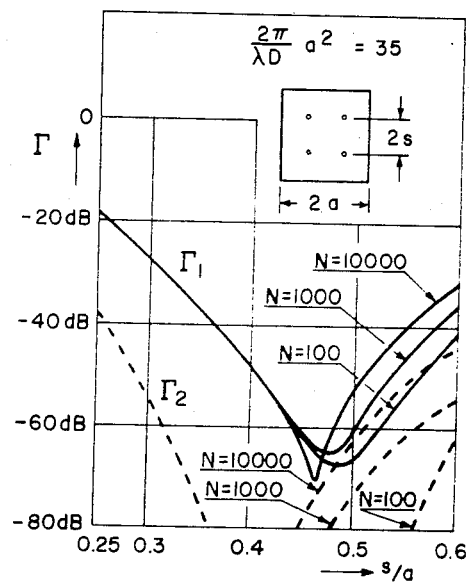
FIG. 6

INVENTOR.
GEORG J. E. GOUBAU

MULTIBEAM OPTICAL WAVE TRANSMISSION

The invention described herein may be manufactured, used, and licensed by or for the Government for governmental purposes without the payment to me of any royalty thereon.

BACKGROUND OF THE INVENTION

Optical beam wave guides have been designed for transmission of optical electromagnetic wave beams using several spaced phase-correcting lenses which reset the phases in the beam expanding cross section to valves prevailing at the beginning of the converging portion of the beam. Such optical beam wave guides are shown and described in U.S. Pat. No. 3,101,472 of G. J. E. Goubau, entitled "Transmission of Electromagnetic Wave Beams," filed Nov. 21, 1958 and issued Aug. 20, 1963. Such optical beam wave guides have been operated experimentally with quartz lenses spaced at 100 meter intervals and with transmission losses of less than 0.5 db. per kilometer, as pointed out in an article by J. R. Christian, G. J. Goubau and J. W. Mink entitled "Further Investigations With An Optical Beam Wave Guide For Long Distance Transmission" appearing at pages 216–219 of IEEE Transactions, Microwave Theory and Techniques, Volume MIT-15 of Apr. 1967.

The most expensive part of such an optical beam wave guide is the pipeline for mounting the lens units at which the iteration of the beam occurs. The sole purpose of these pipelines is to provide a protected, unobstructed light path between the lens unit. By using the same pipeline for simultaneous transmission of several optical beams, the total information capacity of a beam wave guide installation can be increased at a moderate increase in construction cost.

SUMMARY OF THE INVENTION

In contrast to conventional waveguides, a beam wave guide is capable of transmitting several optical beams of the same frequency and the same mode without noticeable interference. The reason for this behavior is based on the fact that the fundamental (Gaussian) mode is primarily determined by the focal length of the lenses and the spacing between lenses, and is only slightly dependent upon the aperture of the lenses. Therefore, the Gaussian mode of a guide with small apertures can be propagated on a guide with the same mode parameter (same focal length and lens spacing) and large apertures along various paths depending upon the relative position and angle between the beam axis and the guide axis at the plane of incidence. For example, by using a single set of lenses of larger diameter than that required for transmission of the same mode in single mode transmission, say, about three times the diameter required for single mode transmission and with a confocal lens arrangement (where one of the foci of two adjacent lenses coincide), each lens is readily capable of passing beams in, say, four regions of the lens. Depending upon the angle between the beam axis and the guide axis at the plane of incidence, four different beam trajectories can be attained for beams passing through a given one of said four regions, assuming beam paths of a type in which one or both the beam coordinates at alternate pairs of lenses is unchanged. With such an arrangement, 16 beams could be propagated simultaneously in the oversized wave guide. Other beam paths can be chosen such as, trajectories passing through the center of alternate lenses. Furthermore, different arrangements of the several regions of each lens through which the beams are passed can be used, and, it is not essential that confocal lens arrangements be used.

There is, of course, a certain gradual change of the field distribution of the injected mode as it propagates from lens to lens because the field distribution is not exactly identical with that of the corresponding mode of the oversized guide. This causes a certain amount of crosstalk between the beams. But even after several thousand iterations, this effect is still very small and of no consequence, particularly if pulse code modulation, which permits relatively high crosstalk levels is used.

A second possibility for multibeam transmission is the use of a separate set of lenses for each beam. If the lenses contain a wedge of appropriate angle, the beams can be guided in such a manner that they intersect halfway between adjacent iterations; this allows for a relatively large sag of the pipeline between the lens units, without causing interference with the beam propagation. If, for example, an array of seven lenses were used at each iteration or lens position along the wave guide, seven separate beams could be transmitted simultaneously by this method.

The most efficient arrangement for multibeam transmission is obtained by a combination of the two preceding methods. A set of M-lenses, can be used, but each lens is made large enough to transmit a group of N-beams simultaneously. Consequently, the total number of optical beams that can be transmitted is MN.

Assuming an iteration path length of 100 meters (the distance between the lenses along the beam path), lenses having a diameter of 4 centimeters are able to guide 16 beams in the manner described with a crosstalk level of less than −40 db. A pipeline of 6 inch diameter can accommodate seven of such beam groups with multiple lenses at each iteration. Thus a total number of 112 beams can be transmitted simultaneously. All of these beams can have the same frequency and thus, can be produced by the same type laser; however, the beams should not be derived from the same laser, since phase coherence between the individual beams can increase crosstalk.

One of the advantages of multibeam transmission is that, because of the enormous information capacity obtainable with multibeam transmission only one type of laser and one type of modulator is needed. Since the information transmitted is divided over many lasers, the power levels of present lasers are quite adequate for a transmission system of this nature. Assuming phase controlled helium-neon lasers and pulse code modulation, a guide with 112 beams would have an information capacity of $1.2 \times 10^{11}$ bits per second which is about 20 times the information capacity of the largest present cables. With phase-locked solid-state lasers it is possible to increase the information capacity further.

Since all beams have the same frequency band, the antireflection coatings of the lenses and prisms, and the reflection coatings of the reflectors used in the transmission can be made for one frequency. In this case, the transmission loss of the guide is only about 0.3 db. per km. Therefore, repeaters may be spaced 50 km. apart or even more. The aforementioned cable requires amplifiers at intervals of only about 3 km. The optical guide, in contrast to a cable, does not require equalizers and temperature compensators since there are no phase or delay distortions in a beam wave guide.

BRIEF DESCRIPTION OF THE DRAWINGS

FIG. 1 is a view showing a typical optical transceiver in accordance with the invention;

FIGS. 2a, 2b, 3a, and 3b are diagrams illustrating typical optical beam paths through a series of optical elements arranged as in FIG. 1;

FIG. 4 is a view showing the regions of certain of the optical elements of FIG. 1 through which the optical beams pass while negotiating paths such as shown in FIGS. 2a, 2b, 3a and 3b.

FIG. 5 is a view analogous to FIG. 4 showing typical beam paths to the type shown in FIGS. 1, 2a, 2b, 3a, 3b, and 4 through a pair of adjacent lenses of quadratic aperture;

FIG. 6 is a graph showing two crosstalk factors $\Gamma_1$ and $\Gamma_2$ as functions of the ratio of $s/a$ for various lens numbers N;

FIG. 7 is a graph showing the total crosstalk factor $\Gamma_{tot}$ as a function of $s/a$ for simultaneous transmission of 16 beam channels through a confocal guide;

FIGS. 8a, 8b, 9a, and 9b are views illustrating typical optical paths which pass the centers of alternate optical elements;

DETAILED DESCRIPTION OF THE PREFERRED EMBODIMENT

Figure 10:
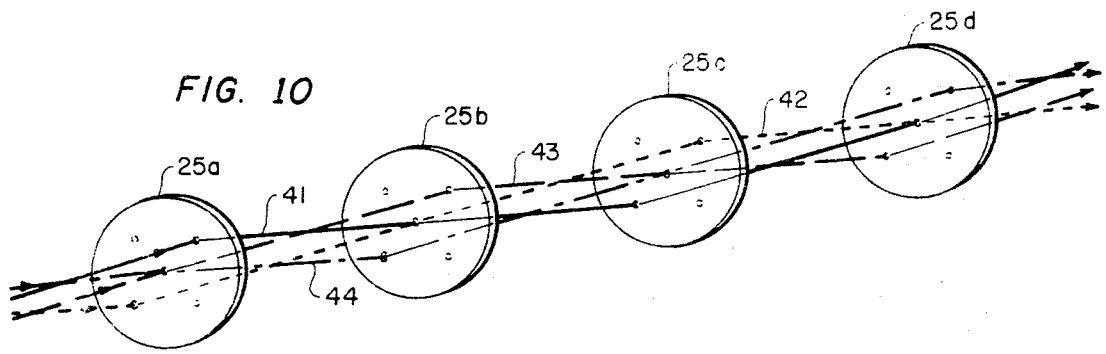
FIG. 10 is a view showing regions of certain optical elements through typical beam paths of which pass beams of the path type shown in FIGS. 8a, 8b, 9a, and 9b.

Referring to the drawings, wherein like or corresponding elements are designated by the same reference characters in the various figures, an optical transceiver is shown in FIG. 1 which comprises an optical beam wave guide 20 forming transmission paths between optical laser transmitters and corresponding optical receivers. The wave guide 20 includes several equally spaced guiding elements 25a, 25b, 25c ... 25n, represented here as double convex lenses of appropriate curvature mounted within an elongated tube 23. Optical energy from the transmitting lasers, in the form of several discrete optical beams which can be modulated in accordance with the desired information, is propagated along wave guide 20 to the corresponding remote optical receivers. This elongated pipe 23 can be made of any material having the required strength, such as metal or concrete, and can be installed adjacent to or beneath the ground. The lenses 25 are individually mounted within the tube wall by means similar to that illustrated and described in a U.S. Pat. application, Ser. No. 771,539, filed Oct. 29, 1968, of Joseph R. Christian, Georg J. Goubau and James W. Mink, entitled "Self-Aligning Beam Wave Guide"; in this joint application, means are provided for correcting for lateral misalignments along the optical guide, such as arising from uneven settling of the ground, and such means can be used in the device of the present invention. The focal length of the lenses is so large compared to the radius of the lenses that, within the operational wavelength range, the reconstitution of the field beam is essentially governed by the laws of optical diffraction rather than by geometrical optical laws.

As pointed out in the aforesaid Goubau U.S. Pat. No. 3,101,472, optical energy emanating from a transmitting antenna as a more or less cylindrical wave beam spreads out into a conical beam a short distance away from the antenna owing to optical diffraction. This spreading of the beam is compensated for by placing phase-correcting means, such as lenses, into the beam path at periodic intervals which are large compared to the beam radius and very large compared to the wavelength of the transmitted energy.

The transmitter for producing the several optical beams can be in the form of a plurality of lasers of the same type. Although these optical beams can have the same frequency band, they should be derived from different lasers, since phase coherence between individual beams from a single laser would complicate the crosstalk problem. It should be noted, in connection with FIG. 1, that independent transmission along a given beam path can be achieved by using different polarizations of the transmitted beams; this transmission may be in the same direction or in opposite directions, i.e., the positions of the transmitters and receivers can be interchanged. A few of the beam paths (that is, the center line of the beams as they travel along wave guide 20) are shown in FIG. 1 by lines. The manner of variation of the cross section of one of the beams over a portion of its path is indicated by the dashed lines 28 and 29.

The manner in which the several optical beams are transmitted through the wave guide lens system 25 is indicated clearly in several figures to be described subsequently. Before proceeding with the description of a typical embodiment of the invention, such as shown in FIG. 4, however, an analysis of beam propagation through a series of aligned lenses first will be provided.

The angular deflection $\delta_n$ of a beam which passes a lens of focal length $f$ at a distance $s_n$ from the center of the lens is $$\delta_n = -S_n/f \quad (1)$$

where the minus sign indicates that the lens deflects the beam toward the lens axis. The beam incident upon a lens $n$ at an angle $\alpha_n$ with respect to a line parallel to the optic axis of the lens, and passing through the point of incidence of the center of the beam upon the lens, proceeds to the following aligned lens $n+1$ at an angle of incidence $\alpha_{n+1}$ given by $$\alpha_{n+1} = \alpha_n + \delta_n = \alpha_n - S_n/f \quad (2)$$

The beam coordinate $y$ at this lens $n+1$ than is $$y_{n+1} = y_n + \alpha_{n+1} \cdot D \quad (3)$$

where $D$ is the spacing between lenses. Similarly, the beam coordinate $x$ at the lens $n+1$ is given by $$x_{n+1} = x_n + \alpha_{n+1} \cdot D \quad (4)$$

From these independent relationships, it is evident that the beam path from lens to lens is dependent upon the position of the beam as it enters the various lenses, as well as the angle at which the beam enters the lenses.

In order to avoid the use of trigonometrical relationships in the calculations of beam paths, the beam passage through a series of aligned lenses can be expressed in terms of the $x$ and $y$ coordinates to the beam as it passes correspondingly pairs of adjacent lenses, in accordance with the following equation $$x_n \text{ or } y_n = A(j)^{n-1} + B(-j)^{n-1} \quad (5)$$

assuming a confocal lens arrangement wherein the lens spacing $D$ is twice the focal length $f$ of the lenses—an arrangement resulting in minimum diffraction losses for a given lens spacing and lens diameter. In equation (5), $x_n$ (or $y_n$) are the $x$ or $y$ coordinates of the beam as it passes through a lens $n$; the $x$ coordinate is the distance measured above or below a horizontal plane passing through the lens center or reference axis 27 and the $y$ coordinate is the displacement right or left of a vertical plane passing through the same lens center or reference axis. $A$ and $B$ are coefficients, either of which may be assigned any desired numerical value within practical geometrical limits of the lenses.

Referring now to FIG. 2a, assuming a beam is directed so as to pass between the first lenses 25a and 25b along a path displaced above the reference axis 27 of the lenses by a distance $y_1 = y_2 = s$. In other words, the path between those two lenses is equidistant from a horizontal plane passing through the reference axis 27 and lies above this axis. The axis 27 is not only the optic axis of the array of aligned lenses 25a to 25n but is also the axis of the pipe or wave guide 20. The equation for the $y$ coordinates of these first two lenses 25a and 25b, from equation (5), are $$y_1 = A(j)^0 + B(-j)^0 = A + B \quad (6)$$
$$y_2 = A(j)^1 + B(-j)^1 = Aj - Bj \quad (7)$$

Since $y_1 = y_2 = s$ $$A + B = A_j - B_j \quad (8)$$

and $$B = A\frac{j-1}{j+1} \quad (9)$$

From Equation 5, one obtains $$y_1 = A(j)^0 + A\frac{j-1}{j+1}(-j)^0 = A + A\frac{j-1}{j+1} = A\frac{2j}{j+1} = s \quad (10)$$

Similarly $$y_2 = A(j)^1 + A\frac{j-1}{j+1}(-j)^1$$
$$= A\left[j + \frac{j-1}{j+1}(-j)\right] = A\frac{2j}{j+1} = y_1 = s \quad (11)$$

$$y_3 = A(j)^2 + A\frac{j-1}{j+1}(-j)^2$$
$$= -A - A\frac{j-1}{j+1} = -A\frac{2j}{j+1} = -y_1 = -s \quad (12)$$

$$y_4 = A(j)^3 + A\frac{j-1}{j+1}(-j)^3$$

$$= A(-j) + A\frac{j-1}{j+1} = -A\frac{2j}{j+1} = -y_1 = -s \quad (13)$$

$$y_5 = A(j)^4 + A\frac{j-1}{j+1}(-j)^4$$

$$= A(1) + A\frac{j-1}{j+1}(1) = A\frac{2j}{j+1} = y_1 = s \quad (14)$$

$$y_6 = A(j)^5 + A\frac{j-1}{j+1}(-j)^5$$

$$= A(1) + A\frac{j-1}{j+1}(-j) = A\frac{2j}{j+1} = y_1 = s \quad (15)$$

and so forth.

From the above equations, it is evident that the real terms of the y coordinates of the beam during transit of the lenses 25a and 25b, etc. follow a variational pattern s, s, −s, −s, s, s, and so forth, and the beam path is as shown in FIG. 2a, assuming that the value of $y_1$ is chosen positive (above the reference axis 27). If, however, the value of $y_1$ is chosen negative, so as the beam initially passes lens 25a somewhere below the reference axis 27, the beam path will be as indicated in FIG. 2b.

If the beam is directed so as to pass between the first lens 25a and the second lens 25b along the path shown in FIG. 3a, then $y_2$ is equal to $-y_1$ and $$y_1 = A(j)^0 + B(j)^0 = A + B \quad (16)$$
$$y_2 = A(j)^1 + B(-j)^1 = Aj - Bj \quad (17)$$
$$Aj - Bj = -(A+B)$$

from which $$A = B\frac{j-1}{j+1} \quad (19)$$

From Equation 5, $$y_1 = B\frac{j-1}{j+1}(j)^0 + B(-j)^0 = B\frac{j-1}{j+1} + B = B\frac{2j}{j+1} = s \quad (20)$$

Similarly $$y_2 = B\frac{j-1}{j+1}(j)^1 - Bj = B\frac{-2j}{j+1} = -B\frac{2j}{j+1} = -y_1 = -s \quad (21)$$

$$y_3 = B\frac{j-1}{j+1}(j)^2 + B(-j)^2$$

$$= -B\left[\frac{j-1}{j+1} + 1\right] = -B\frac{2j}{j+1} = -y_1 = -s \quad (22)$$

$$y_4 = B\frac{j-1}{j+1}(j)^3 + B(-j)^3$$

$$= B\frac{j-1}{j+1}(-j) + Bj = +B\frac{2j}{j+1} = y_1 = s \quad (23)$$

$$y_5 = B\frac{j-1}{j+1}(j)^4 + B(-j)^4$$

$$= B\frac{j-1}{j+1}(1) + B(1) = B\frac{2j}{j+1} = y_1 = s \quad (24)$$

and $$y_6 = B\frac{j-1}{j+1}(j)^5 + B(-j)^5 = B\frac{j-1}{j+1}(j) + B(-j)$$

$$= B\frac{-2j}{j+1} = -B\frac{2j}{j+1} = -y_1 = -s \quad (25)$$

and so forth.

From the above equations, the real terms for the y coordinates of the beam during passage through lenses 25a, 25b, 25c, etc. are s, −s, −s, s, s, −s, −s, and so forth, and the beam path is as shown in FIG. 3a, when the value of s is chosen positive, or as indicated in FIG. 3b when the value of s is chosen negative.

Similarly, one can establish beam paths in the x coordinate. If one desires the beam to travel between lenses 25a and 25b along a path lying to the right of a vertical plane passing through the reference axis 27, then $x_1 = x_1 = s$.

Since $\quad x_1 = A(j)^0 + B(-j)^0 A + B \quad (26)$ and $\quad x_2 = A(j)^1 + B(-j)^1 Aj - Bj \quad (27)$ then $B$ turns out to be equal to $A j-1/j+1$, as before, and $$x_1 = A(j)^0 + A\frac{j-1}{j+1}(-j)^0 = A\frac{2j}{j+1} = s \quad (28)$$

$$x_2 = A(j)^1 + A\frac{j-1}{j+1}(-j)^1 = A\frac{2j}{j+1} = s \quad (29)$$

and so forth, in the same manner as for the y coordinates $y_1$, $y_2$, etc. The equations for x are the same as those for the y except that the beam trajectory now is viewed from an axis orthogonal to that of the beam trajectory arrived at from the y equations. In other words, the beam paths shown in FIGS. 2a, 2b, 3a and 3b may also be considered as representing the x displacement of the beam and the dimensions indicated in these figures as $y_1$, $y_2$ and $y_3$ would now be $x_1$, $x_2$ and $x_3$, respectively. A displacement to the right of the reference axis 27 is referred to as positive and a displacement to the left of said axis as negative, just as displacements above and below said reference axis are referred to as positive and negative, respectively. In the lens diagram of FIGS. 2a, 2b, 3a and 3b the paths of the beam are indicated by a series of connected lines; these lines, of course, represent the center of the optical beam which is of generally cylindrical cross section.

Although other beam paths can be derived, as will be explained later, an explanation of the multibeam transmission in FIG. 4 will be made with reference to the paths of the type shown in FIGS. 2a, 2b, 3a and 3b for both x and y coordinates.

In describing the system of FIG. 4 having a single lens at each lens position capable of passing multiple optical beams simultaneously, it is assumed, the sake of explanation, that there are four regions at each lens through which optical beams can be directed. These regions, bounded by the dotted circles and labeled 1, 2, 3, 4 for the first lens 25a, 1′, 2′, 3′, and 4′ for the second lens 25b, and so forth, also represent the beam cross section upon passage through the corresponding lens. The locus of the beam center or axis is indicated by the various lines and the point of intersection of the center of a beam with the lens is indicated by a dot. The four regions 1, 2, 3, 4, etc. for the several lenses can be referred to, in the example given, as the upper right, lower right, lower left, and upper left regions, respectively and the x and y coordinates of the centers of the regions 1, 2, 3, and 4 can be represented as (+, +), (+, −), (−, −) and (−, +), respectively. Likewise, the same coordinates apply to corresponding 1′ and 4′, and so forth.

From the analysis of the beam paths shown in FIGS. 2a, 2b, 3a and 3b, and with the beam area representation shown in FIG. 4, it is now possible to set up table I for the 16 possible beam paths in the system of FIG. 4. The beam paths are designated by the regions of the initial lens 25a and the second lens 25b through which the beam passes. For example, a beam passing through region 2 of lens 25a and thence through region 4′ of lens 25b is referred to as the beam path 2–4′. The coordinates $x_n$ or $y_n$ (=±s), for a given region, represent the distance between and center of the region and the wave guide axis 27, taken either in the x-direction or the y-direction. The designation $x_n$, $y_n$ for the beam at a given lens n indicates the location s of the point of passage of the beam center at the lens n from respective vertical and horizontal planes passing through the reference axis 27. It should be noted that any arbitrary value, within the geometric limits of the lens, may be assigned to s. For example, if the lens diameter is 6 centimeters and one desires the center of a given beam to pass through a point on the lens displaced 2.2 centimeters to the right of the reference axis 27 and 2.2 centimeters above said reference axis, then s will be assigned a value of 2.2. For the purposes of table I, the actual coordinates for all beam paths shown in FIGS 2a, 2b, 3a and 3b will be indicated in table I in terms of the coefficient s.

TABLE 1

| Beam path | $x_1, y_1$ | $x_2, y_2$ | $x_3, y_3$ | $x_4, y_4$ | $x_5, y_5$ | $x_6, y_6$ | $x_7, y_7$ |
|---|---|---|---|---|---|---|---|
| 1–1′ | s, s | s, s | −s, −s | −s, −s | s, s | s, s | −s, −s |
| 1–2′ | s, s | s, −s | −s, −s | −s, s | s, s | s, −s | −s, −s |
| 1–3′ | s, s | −s, −s | −s, −s | s, s | s, s | −s, −s | −s, −s |
| 1–4′ | s, s | −s, s | −s, −s | s, −s | s, s | −s, s | −s, −s |

Table I—Continued

| Beam path | Coordinates | | | | | | |
|---|---|---|---|---|---|---|---|
| | $x_1, y_1$ | $x_2, y_2$ | $x_3, y_3$ | $x_4, y_4$ | $x_5, y_5$ | $x_6, y_6$ | $x_7, y_7$ |
| 2-1' | $s, -s$ | $s, s$ | $-s, s$ | $-s, -s$ | $s, -s$ | $s, s$ | $-s, s$ |
| 2-2' | $s, -s$ | $s, -s$ | $-s, -s$ | $-s, s$ | $s, -s$ | $s, -s$ | $-s, s$ |
| 2-3' | $s, -s$ | $-s, -s$ | $-s, s$ | $s, s$ | $s, -s$ | $-s, -s$ | $-s, s$ |
| 2-4' | $s, -s$ | $-s, s$ | $-s, -s$ | $s, -s$ | $s, -s$ | $-s, s$ | $-s, s$ |
| 3-1' | $-s, -s$ | $s, s$ | $s, s$ | $-s, -s$ | $-s, -s$ | $s, s$ | $s, s$ |
| 3-2' | $-s, -s$ | $s, -s$ | $s, s$ | $-s, s$ | $-s, -s$ | $s, -s$ | $s, s$ |
| 3-3' | $-s, -s$ | $-s, -s$ | $s, s$ | $s, s$ | $-s, -s$ | $-s, -s$ | $s, s$ |
| 3-4' | $-s, -s$ | $-s, s$ | $s, s$ | $s, -s$ | $-s, -s$ | $-s, s$ | $s, s$ |
| 4-1' | $-s, s$ | $s, s$ | $s, -s$ | $-s, -s$ | $-s, s$ | $s, s$ | $s, -s$ |
| 4-2' | $-s, s$ | $s, -s$ | $s, -s$ | $-s, s$ | $-s, s$ | $s, -s$ | $s, -s$ |
| 4-3' | $-s, s$ | $-s, -s$ | $s, -s$ | $s, s$ | $-s, s$ | $-s, -s$ | $s, -s$ |
| 4-4' | $-s, s$ | $-s, s$ | $s, -s$ | $s, -s$ | $-s, s$ | $-s, s$ | $s, -s$ |

The portion of the table for the four beam paths through the upper right region 1 of the initial lens 25a is listed in the first four items of table I. For the sake of drawing clarity, FIG. 4 shows only four beam paths, namely, the paths designated as 1-1', 1-2', 1-3' and 1-4' in table I and indicated by lines 31, 32, 33 and 34, respectively, in FIG. 4. These four paths intersect at alternate lenses 25a, 25c, 25e, and so forth. For example, the four beam centers pass through region 1 of initial lens 25a, through region 3'' of a third lens 25c, and through the three regions of lenses 25e, 25g, etc., not shown in FIG. 4. On the other hand, the beam centers are displaced at the four widely spaced regions 1', 2', 3', 4' at the second lens 25b and also at the corresponding 1 to 4 regions of the fourth lens 25d, as well as at corresponding spaced regions at lenses 25f, and 25h, etc., not shown in FIG. 4.

As indicated in table I, three other sets of four beams can be directed at each of the regions 2, 3, and 4 of the initial lens 25a, providing a total of 16 discrete beam paths.

If the lens apertures were infinitely large, each beam axis would follow a ray-optical path, the combined fields would be repeated exactly at every fourth lens, and the initial crosstalk between beams at the input of the guide would remain unchanged. In reality, however, the finite apertures of the lens introduced diffraction effects which, in turn, cause coupling between the optical beams. The effect of this coupling on the crosstalk has been studied for various cases, examples of which are described in FIG. 6. The computations were performed for lenses having quadratic (rectangular) apertures, such as shown in FIG. 5, since, for such apertures, the required large number of eigen values of the mode functions are more readily available. For single beam transmission, there is little difference in the diffractional losses of lenses having circular apertures (FIG. 4) and those having quadratic apertures (FIG. 5) of equal area. It is probable that the same applies to diffractional crosstalk in multibeam transmission. The incident beams were assumed to be ideal Gaussian beams and receivers matched to the beams were assumed to be placed behind the final lens at positions where, in the case of infinitely large lens apertures, maximum reception would occur.

In FIG. 5, which illustrates only four beam paths, two of the beam paths pass through the upper right regions of initial lens 25a, corresponding to regions 1 and 1' of FIG. 4. The beam path represented in FIG. 5 by the line 31 is the 1-1' path and that represented by the line 33 is the 1-3' path. The beam paths indicated by the line 36 and line 37 are, respectively, the 3-3' and 3-1' paths, already referred to in table I. It should be noted that corresponding paths in FIGS. 4 and 5 are not necessarily indicated by the same line character.

Table II shows the set of crosstalk factors (i.e., the power ratio between interfering signal and desired signal) between channel 1-1' and the other 15 channels.

TABLE II

| Cross talk factor between beam channel 1-1' and beam channel | Cross talk factor |
|---|---|
| 1-2', 2-1', 1-4', or 4-1' | $\Gamma_1$ |
| 2-2' or 4-4' | $\Gamma_2$ |
| 1-3', 3-1', 4-2', or 2-4' | $\Gamma_1^2$ |
| 2-3', 3-2', 3-4', or 4-3' | $\Gamma_1\Gamma_2$ |
| 3-3' | $\Gamma_2^2$ |

The curves of FIG. 6 show the crosstalk factors $\Gamma$ for two pairs of beam channels or paths in an optical guide designed for simultaneous transmission of 16 mutually phase incoherent beam paths. The crosstalk factors are plotted as functions of the ratio of the spacing $2s$ of the crossover centers of the beams at the lenses to the diameter $2a$ of the lens aperture for N=100, 1,000 and 10,000, where N is the number of lenses. If the transmitted wave length is 0.6328 microns and the lens spacing is 100 meters, then the aperture dimension $2a$ in FIG. 6 is 3.76 centimeters. The curves $\Gamma_1$ show the crosstalk factor, in decibel, for a pair of channels propagating along paths of the type 1-1' and 1-2', or 1-1' and 1-4'. Beam channels with paths of the type 1-1' and 2-2', or 1-1' and 4-4' have crosstalk factors shown by the curves marked $\Gamma_2$. The crosstalk factor between any other path of beam channels can be spaced in terms of $\Gamma_1$ and $\Gamma_2$, as shown in table II.

The total crosstalk factor $\Gamma_{tot}$ produced by the combined 15 channels, assuming equal beam power in each channel, is shown in FIG. 7. It can be shown that each channel has the same $\Gamma_{tot}$.

The crosstalk factors for small values of $s/a$ are determined essentially by the mutual proximity of the beams. They have substantially the same values as at the input of the guide, and decrease with increasing beam spacing. When the beams are moved closer to the periphery of the lens, aperture diffraction becomes a determining factor. All curves for $\Gamma$ show a minumum between $s/a$=0.4 and 0.5. For a given receiver position, this minimum fluctuates with the number of lenses N and may even decrease with increasing N, as demonstrated by the example presented. This indicates that crosstalk can be minimized by appropriate positioning of the receivers. If diffraction caused by the lens apertures were the only cause of crosstalk, a guide with lenses of only 5 centimeters diameter and a lens spacing of 100 meters would permit the transmission of 16 Gaussian beams at a wavelength of 0.6328 microns over distances of greater than 1,000 km. with a crosstalk level of less than −60 db. However, unavoidable phase errors of the lenses also produce some crosstalk.

Another type of beam path can be derived from equation (5) wherein the beam passes through the centers of alternate lenses. If it is evident that the beam passes through the center of the first lens 25a and then to a region adjacent the upper apex of the second lens 25b, one can express the y coordinates of the first and second lenses as follows:

$$y_1 = A(j)^0 + B(-j)^0 = A + B \quad (30)$$

Since $$y_1 = 0, \text{ then } A + B = 0 \text{ and } B = -A.$$

From equation (5), $$y_2 = A(j)^1 + B(-j)^1 = A(j) - A(-j) = 2Aj = s \quad (31)$$

Similarly $y_3 = A(j)^2 + B(-j)^2 = -A(-1) - A(-1) = 0 \quad (32)$ $$y_4 = A(j)^3 B(j)^3 = -Aj - Aj = -2Aj = -y_2 = -s \quad (33)$$

and so forth.

The y coordinates of the beam as it passes lenses 25a, 25b, 25c, etc. of 0, s, 0, −s, 0, and so forth. This beam path is represented by FIG. 8a. Obviously, if the value assigned to s is chosen negative (below the reference axis 27) then the beam path is as shown in FIG. 8b.

If the beam passes through the center of the second lens 25b, rather than through the center of the first lens 25a, than $$y_2 = Aj - Bj = 0 \text{ and } B = A \quad (34)$$

From equation (5), $$y_1 = A(j)^0 + (-j)^0 A(1) + A(1) = 2A = s \quad (35)$$

$$y_3 = A(j)^2 + (-j)^2 = A(-1) + A(-1) = -2A = -s \quad (36)$$

$$y_4 = A(j)^3 + (-j)^3 = A(-j) + A(j) = 0 \quad (37)$$

and so forth.

The path thus established is as indicated in FIG. 9a, provided the value assigned to s is positive. If the value assigned in s is negative, than the path shown in FIG. 9b is attained.

As for the beam paths of FIGS. 2a, 2b, 3a and 3b, the x coordinates can be obtained in the same manner as the y coordinates and the eight types of beam trajectories, with their x and y coordinated at each of the first six lenses, is as indicated in table III.

TABLE III

| Beam path designation | Lens coordinates | | | | | |
|---|---|---|---|---|---|---|
| | $x_1, y_1$ | $x_2, y_2$ | $x_3, y_3$ | $x_4, y_4$ | $x_5, y_5$ | $x_6, y_6$ |
| I | s, s | 0, 0 | −s, −s | 0, 0 | s, s | 0, 0 |
| II | s, −s | 0, 0 | −s, s | 0, 0 | s, −s | 0, 0 |
| III | −s, s | 0, 0 | s, −s | 0, 0 | −s, s | 0, 0 |
| IV | −s, −s | 0, 0 | s, s | 0, 0 | −s, −s | 0, 0 |
| V | 0, 0 | s, s | 0, 0 | −s, −s | 0, 0 | s, s |
| VI | 0, 0 | s, −s | 0, 0 | −s, s | 0, 0 | s, −s |
| VII | 0, 0 | −s, s | 0, 0 | s, −s | 0, 0 | −s, s |
| VIII | 0, 0 | −s, −s | 0, 0 | s, s | 0, 0 | −s, s |

An example of beam paths of this general type, characterized by beam passage through the center of alternate lenses, is shown in FIG. 10. The beam paths I, IV, V and VIII are indicated in FIG. 10 by the solid line 41, the short dashed line 42, the long dashed line 43 and the dot-dashed line 44, respectively. The dots at each lens represent the center of the beam transmittal regions, just as in FIG. 4.

Figure 11:
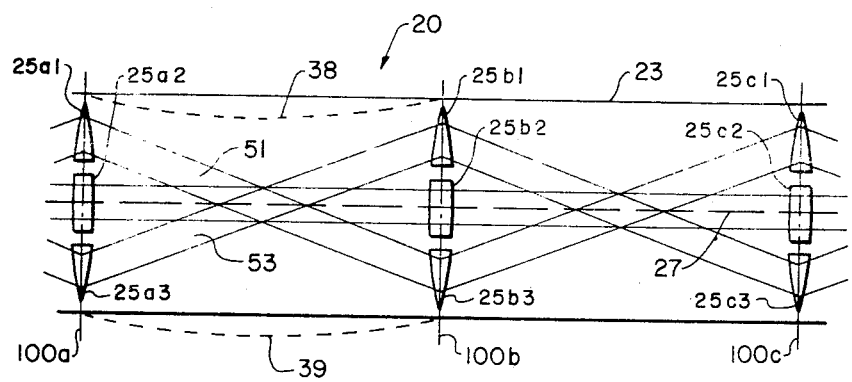
FIGS. 11 and 12 are views showing an optical waveguide having several optical elements at each iteration position, each element passing only one optical beam.
Figure 12:
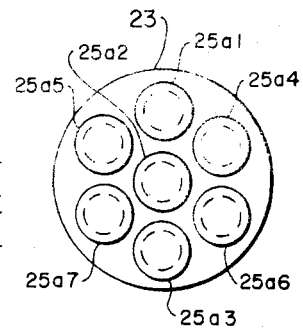

An alternate method of multiple beam transmission is shown in FIGS. 11 and 12 wherein, at each iteration or lens position along the wave guide 20, a separate lens is used for each of the several optical beams being transmitted. As shown, by way of example, in FIG. 12, there are seven optical elements 25a1 to 25a7 at the initial lens position 100a and seven correspondingly arranged elements at subsequent lens positions 100b ... 100n, for the seven optical beams to be transmitted. Only three of the optical elements, namely, 25a1, 25a2 and 25a3 are visible in FIG. 11 at each lens position.

If all lenses except the centrally disposed lenses 25a2, 25b2, etc. contain a wedge of appropriate angle, the beams can be guided in such a manner as to intersect substantially halfway between adjacent iteration or lens position, as shown in FIG. 11. This allows for a relatively large sag of the pipeline 20 between lens unit, as indicated by the dashed lines 38, 39 without causing interference with beam propagation.

Figure 13:
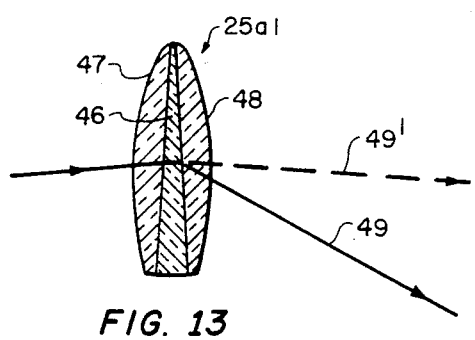
FIG. 13 is a view showing a typical wedged lens optical element which can be used in the device shown in FIGS. 11 and 12.

A typical wedged lens 25a1 is shown in FIG. 13 and includes a central prism or optical wedge 46 having planar-convex lenses 47 and 48 attached, as by optically transparent cement, to opposite tapered surfaces of the wedge 46. The wedged lens also can be formed by grinding each of the two oppositely tapered surfaces of a wedge or prism so as to have a convex contour. Alternatively, the wedged lens can be of the liquid-filled type in which a prismatic liquid layer is positioned between two half lenses. The effect of the wedged lends of FIG. 13 is to bend the beam, as indicated by the solid line 49, by an amount greater than would be the case using a convex lens without a wedge—indicated by the dashed line 49'.

At each lens station shown in FIG. 11, the uppermost optical element or phase correcting means of FIG. 11, that is, the optical element of FIG. 12, will be the type shown in FIG. 13, while the lowermost optical element, that is, the optical element 25a3 of FIG. 12, will be an inverted version of the upper optical element, so that the beam passing such an element will be bent upwardly. The centrally disposed phase correcting means of FIG. 11, that is optical element 25a2 in FIG. 12, will be a conventional double convex lens, since any bending of the beam passing therethrough should be only that caused by refraction, such as already indicated in FIG. 2a, 2b, 3a, 3b, 4a, 4b, 5a, 5b, 8a, 8b, 9a, 9b and 10 and should not exceed the diameter of the optical elements 25a2. The radii of curvature of the lens portions of the wedged lenses and of the regular lenses at the center of the wave guide should be substantially identical, so that the lenses accomplish the proper beam iteration.

FIG. 11 illustrates a few typical beam paths through the optical elements at the first three lens positions 100a, 100b and 100c. For example, a beam 51 entering the upper optical element 25a1 at the initial lens position 100a is bent downwardly and impinges upon the lower optical elements 25b3 at the second lens position 100b. This beam next is bent upwardly by optical element 25b3, and passes through the upper optical element 25c1 at the third lens position 100c, etc. The cross-sectional area of the beam passing through the optical elements is indicated by the dotted circles in FIG. 12. Similarly, a beam 53 entering the lower optical element 25a3 at the initial lens position 100a is bent upwardly by the wedged lens 25a3 and passes through the upper wedged lens 25b1 at the second lens position 100b, where it is bent downwardly to the lower wedged lens 25c3 at the following lens position 100c, etc. The beam 52 entering the central optical element 25a2 at the first lens position 100a passes straight through the various centrally positioned lens elements 25b2 and 25c2, etc. of succeeding lens positions. All beams other than the centrally positioned beam, therefore, are bent by the wedged portion of the corresponding wedged lens so as to confine the beam as much as possible to the region of the axis 27 of the optical guide 20 between adjacent lens positions.

Figure 14:
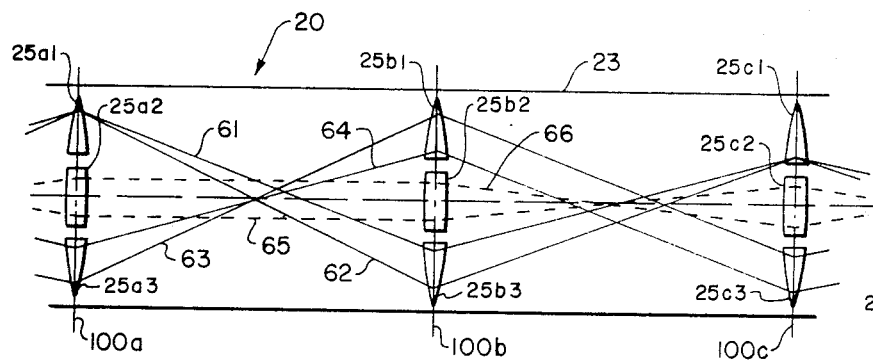
FIGS. 14 and 15 illustrate a combination of the arrangement shown in FIGS. 1 and 4 and the arrangement shown in FIGS. 11 and 12.
Figure 15:
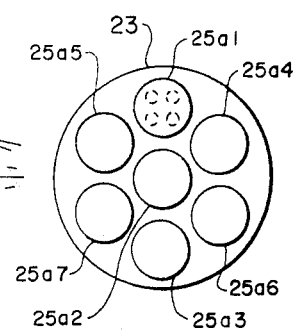

As previously mentioned, one can combine the system using at each lens position a single lens for transmitting N beams, as exemplified in FIGS. 4 and 10, and a system using a separate lens at each lens position for each of the N beams, such as shown in FIGS. 11 and 12. Such an approach is illustrated in FIGS. 14 and 15, wherein the wave guide 20 includes a plurality of optical elements 25a1 to 25a7 at each lens station or position. The physical structure of optical wave guide 20 of FIGS. 14 and 15 can be identical to that shown in FIGS. 12 to 14, except for the size; the aperture size of the optical elements 25a1 to 25a7 of FIGS. 14 and 15 would have to be increased, relative to that of the optical elements 25a1 to 25a7 of the device of FIGS. 11 and 12, because of the need for accommodating several beams simultaneously. In FIG. 15, the regions in which multiple beams can be directed through the lens elements 25a1 to 25a7 is indicated by the dotted circles, just as in FIG. 4. For the sake of simplicity, only one lens element 25a1 includes the dotted circles.

In FIG. 14, six out of a possible 102 beam paths are illustrated; the 102 beam paths result from the use of seven lenses, each capable of simultaneously transmitting 16 beams, in the manner indicated in FIG. 4 and table I. FIG. 15 shows the geometrical arrangement of the optical elements 25a1 to 25a7 at a given lens position and the dotted circles (shown only in one lens in FIG. 15 for drawing simplicity) indicate a location of the 16 beams as they pass through four regions in the corresponding lens element.

The solid line 61 in FIG. 14 illustrates a beam path corresponding to the 1-1' beam path of FIG. 4 which enters the upper wedged lens element 25a1 at the first lens position 100a at the upper right region. The wedge angle of the wedge portion of the optical element 25a1 is such that this beam is bent downwardly by an amount sufficient to impinge upon the upper right portion of the lower optical element 25b3 at the second lens position 100b. The action of the wedge in the lower optical element 25b3 bends the beam upwardly so that it impinges upon a lower left portion of the upper optical element 25c1 at the third lens position 100c.

A beam of the 1-2' type follows the paths taken by the solid line 62 and would be deflected by the wedged lens 25a1 at the first lens position 100a from the upper right region of the first upper optical element 25a1 to the lower right region of the lower wedged lens 25b3 at second lens position 100b; thence, it is deflected by the element 25b3 to the lower left portion of the upper right lens 25c1 at the third lens position 100c.

The solid line 63 shown the path for a 2-4' beam which is incident upon the lower right region of the lower optical element 25a3 at the first lens position 100a. Because of the wedge in the optical element 25b3, however, the beam is deflected upwardly to the upper left region of the upper optical element 25b1 of second lens position 100b; from here, it is deflected downwardly by the optical element 25b1 to the upper left region of the lower optical element 25c3 at the third lens position 100c.

The solid line 64 shows the path for a 4-3' beam which, after passing initially through optical element 25a3 at lens station 100a is then bent upwardly to the lower left region of upper optical element 25b1 at the lens position 100b; thence is bent downwardly to the lower left region of the lower optical element 25c3 at lens position 100c.

The dashed line 65 shows a path for a 3–3' beam passing through the optical element 25a2 at the first lens position 100a. Since the optical element 25a2 at lens position 100a contains no wedge or prism, a beam incident on the lower left region of lens 25a2 will follow a path such as shown in FIG. 4 and outlined in table I and will pass through the lower left region of lens 25b2 at the second lens position 100b and then will be diffracted by lens 25b2 to the upper right region of the lens 25c2 at the third lens position 100c.

The dashed line 66 indicates the path of a 1–1' beam passing through the upper right region of the optical element 25a2 of the first lens position 100a. The path continues through the upper right region of optical element 25b2 at the second lens position 100b and thence through the lower left region of the lens 25c2 at the third lens position 100c.

The invention is not to be limited to exact details described herein. For example, the beam wave guide may include a set of reflectors for iterating the optical beam in lieu of the lenses already described. An example of such reflectors is shown at page 69, and described at pages 68 and 69, of "Advances In Microwave," Volume 3, published by Academic Press Inc., New York, in 1968.

What is claimed is:

1. A system for propagating simultaneously several independent optical beams along an optical guiding medium comprising means for generating a plurality of independently oriented space coherent optical beams, means including a plurality of beam-iterating optical assemblies disposed at spaced beam-iterating positions and aligned along said guiding medium, and means for directing each of said independent optical beams through said optical assemblies along a different path within said guiding medium which is dependent upon the original orientation of said optical beam, said optical assemblies at each of said beam-iterating positions comprising a plurality of focusing optical elements, and all of those of said elements at each beam-iterating position displaced from the axis of said guiding medium including defection means to cause said optical beams to intersect the axis of said optical guiding medium substantially midway between all of the adjacent beam-iterating positions to reduce crosstalk owing to sagging of said beam guiding medium.

2. A system as recited in claim 1 wherein each of said elements at said given position pass one only of said optical beams.

3. A system according to claim 2 wherein the elements displaced from the axis of said guiding medium include a prism integrally combined with a lens.

4. A system according to claim 1 wherein said beams are arranged in groups and each of the beams of a given group is directed upon a separate preselected region of a given optical element at a corresponding beam-iterating position by an element of a proceeding beam-iterating position and the individual beams of the given group pass through the corresponding preselected region of said given element at different angles with respect to the optical axis of that element.

5. A system according to claim 4 wherein the elements displaced from the axis of said guiding medium include a prism integrally combined with a lens.

6. A system according to claim 4 wherein each of said elements at a given beam-iterating position deflect all beams emerging from that element onto a single element at the next beam-iterating position.

7. A system according to claim 1 wherein the elements displaced from the axis of said guiding medium include a prism integrally combined with a lens.

* * * * *